United States Patent
Hartman

(10) Patent No.: US 7,329,099 B2
(45) Date of Patent: Feb. 12, 2008

(54) WIND TURBINE AND ENERGY DISTRIBUTION SYSTEM

(76) Inventor: Paul Harvey Hartman, 11631 Cherry Hollow Dr., Chardon, OH (US) 44024

( * ) Notice: Subject to any disclaimer, the term of this patent is extended or adjusted under 35 U.S.C. 154(b) by 293 days.

(21) Appl. No.: 11/210,068

(22) Filed: Aug. 23, 2005

(65) Prior Publication Data

US 2007/0048137 A1   Mar. 1, 2007

(51) Int. Cl.
F03D 1/06 (2006.01)

(52) U.S. Cl. .................................. 416/132 B; 415/4.4

(58) Field of Classification Search ................. 415/4.2, 415/4.4, 197 A, 197 R; 290/43, 44, 54, 55; 416/132 B
See application file for complete search history.

(56) References Cited

U.S. PATENT DOCUMENTS

| | | | |
|---|---|---|---|
| 1,674,169 A | 6/1928 | Flettner | |
| 1,835,018 A | 12/1931 | Darrieus | |
| 2,221,952 A | 11/1940 | Pier | |
| 2,654,695 A | 10/1953 | Gilbert | |
| 2,682,235 A | 6/1954 | Fuller | |
| 3,152,063 A | 10/1964 | Schroeder | |
| 3,952,723 A | 4/1976 | Browning | |
| 3,975,169 A | 8/1976 | Gent | |
| 3,995,170 A | 11/1976 | Graybill | |
| 4,003,676 A | 1/1977 | Sweeney | |
| 4,012,163 A * | 3/1977 | Baumgartner et al. | ... 415/208.3 |
| 4,050,246 A | 9/1977 | Bourquardez | |
| 4,151,424 A | 4/1979 | Bailey | |
| 4,180,367 A | 12/1979 | Drees | |
| 4,204,796 A * | 5/1980 | Pack, Jr. | ...................... 415/4.4 |
| 4,205,961 A | 6/1980 | Moller | |
| 4,247,253 A | 1/1981 | Seki et al. | |
| 4,274,010 A | 6/1981 | Lawson-Tancred | |
| 4,291,235 A | 9/1981 | Bergey | |
| 4,342,539 A | 8/1982 | Potter | |
| 4,525,911 A | 7/1983 | Storm | |
| 4,417,853 A | 11/1983 | Cook | |

(Continued)

OTHER PUBLICATIONS

L H Billings, Falk Sport Facts, No. 87, 'Setting Jibs' p. 2, 1973, Falk Publications.

(Continued)

Primary Examiner—Edward K. Look
Assistant Examiner—Devin Hanan

(57) ABSTRACT

A new design of vertical axis wind turbine is disclosed based on a dome structure using dome struts as blades that work in concert to produce rotational motion. The stability and low cost of the new design allows the turbine to function in low wind speed regimes as well as high speed winds that would be encountered in off-shore wind installations. The large stresses and structural requirements of mounting large horizontal axis wind turbines, particularly off-shore, are avoided with the new system. A new energy distribution system is proposed that will capture abundant off-shore wind energy, store it aboard a generator/delivery ship in the form of Hydrogen gas, and deliver it to an existing shore based power plant to produce electricity using a conventional gas turbine. Alternatively, the Hydrogen can be used to produce methane from coal using known processes to add natural gas to pipelines in areas that would normally be consuming the material. Both applications, and the direct production of heat by the new turbines, would stabilize our national energy grid while reducing CO2 emissions.

23 Claims, 7 Drawing Sheets

U.S. PATENT DOCUMENTS

| | | | |
|---|---|---|---|
| 4,430,044 | A | 2/1984 | Liljegren |
| 4,449,053 | A | 5/1984 | Kutcher |
| 4,609,827 | A | 9/1986 | Nepple |
| 4,748,808 | A * | 6/1988 | Hill ............... 60/398 |
| 4,976,940 | A | 12/1990 | Paulson |
| 5,299,913 | A | 4/1994 | Heidelburg |
| 5,401,589 | A | 3/1995 | Palmer |
| 5,445,099 | A | 8/1995 | Rendina |
| 5,499,904 | A | 3/1996 | Wallace |
| 5,955,039 | A | 9/1999 | Dowdy |
| 6,013,158 | A | 1/2000 | Wootten |
| 6,083,382 | A | 7/2000 | Bird |
| 6,100,600 | A | 8/2000 | Pflanz |
| 6,790,430 | B1 | 9/2004 | Lackner |
| 6,908,349 | B2 | 6/2005 | Stephens |
| 6,979,170 | B2 * | 12/2005 | Dery et al. ............ 415/4.2 |
| 2003/0168864 | A1 | 9/2003 | Heronemus |

OTHER PUBLICATIONS

C P Gilmore, Popular Science, Jan. 1984, pp. 70-73, 'Spin Sail—The Magnus Effect'.

NASA, Pub # C-83-2880, (1978), '100 kW Wind Turbine Specifications', pp. 1-2, Natl Aeromautics and Space Administration.

Northern Power Systems, pdb_NW100_19_1.llet. ' Northwind NW 100/9 Simiplicity by Design', Northern Power, (Waitsfield VT).

Proton Energy Systems, 'Hogen RE Hydrogen Generation Systems', Rev Nov. 2004, Proton Energy Systems, (Wallingford CT).

Belasko et al, 'Roof Integrated Solar Heating System', Solar Energy 76(2004)61-69, Elesevier Science, UK, www.sciencedirect.com.

J Browne, 'Beyond Kyoto', Foreign Affairs, Jul/Aug. 2004, pp. 20-31, (p. 23).

C J Tasasava, 'Launchirga Thousand Ships . . . American Shipbuilding 1940-1945' Dissertation N.Western U., Jun. 2003, k'word Liberty Ships.

U.S. Appl. No. 10/624,363, Hartman.

Northern Power Systems, pdb_NW100_19_1.llet. 'Northwind NW 100/9 Simiplicity by Design', Northern Power, (Waitsfield VT), Year 2006.

* cited by examiner

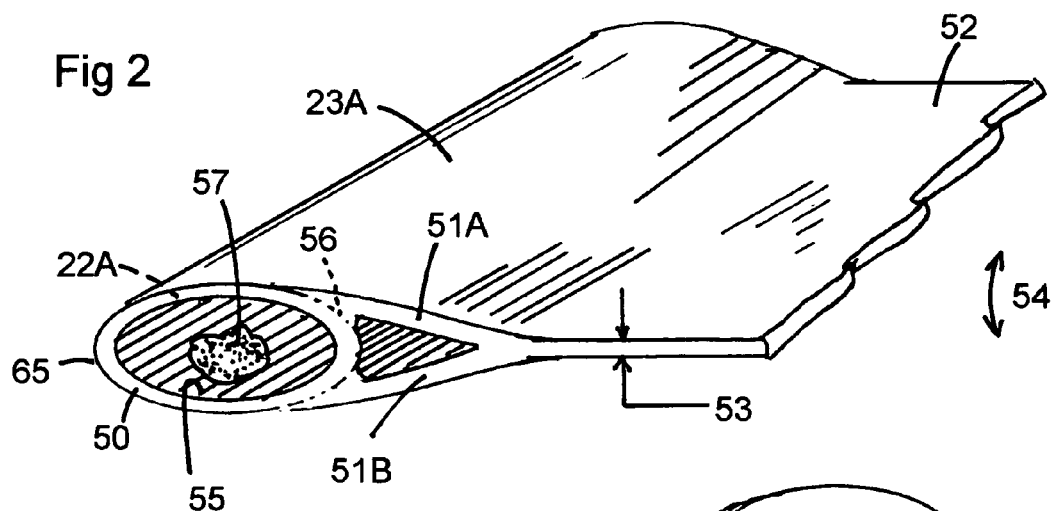
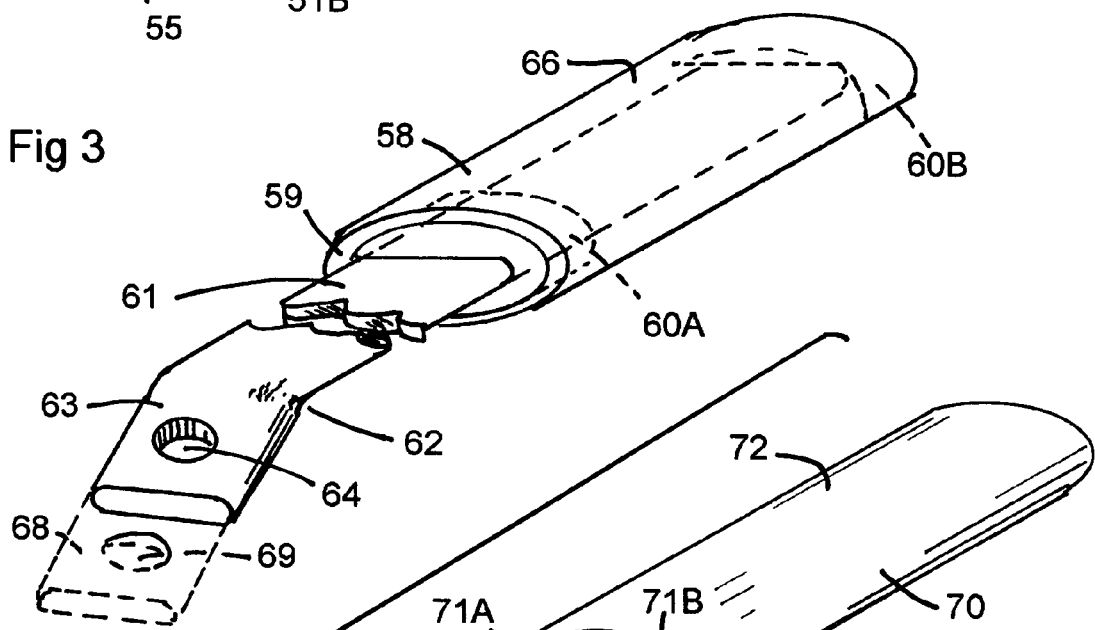
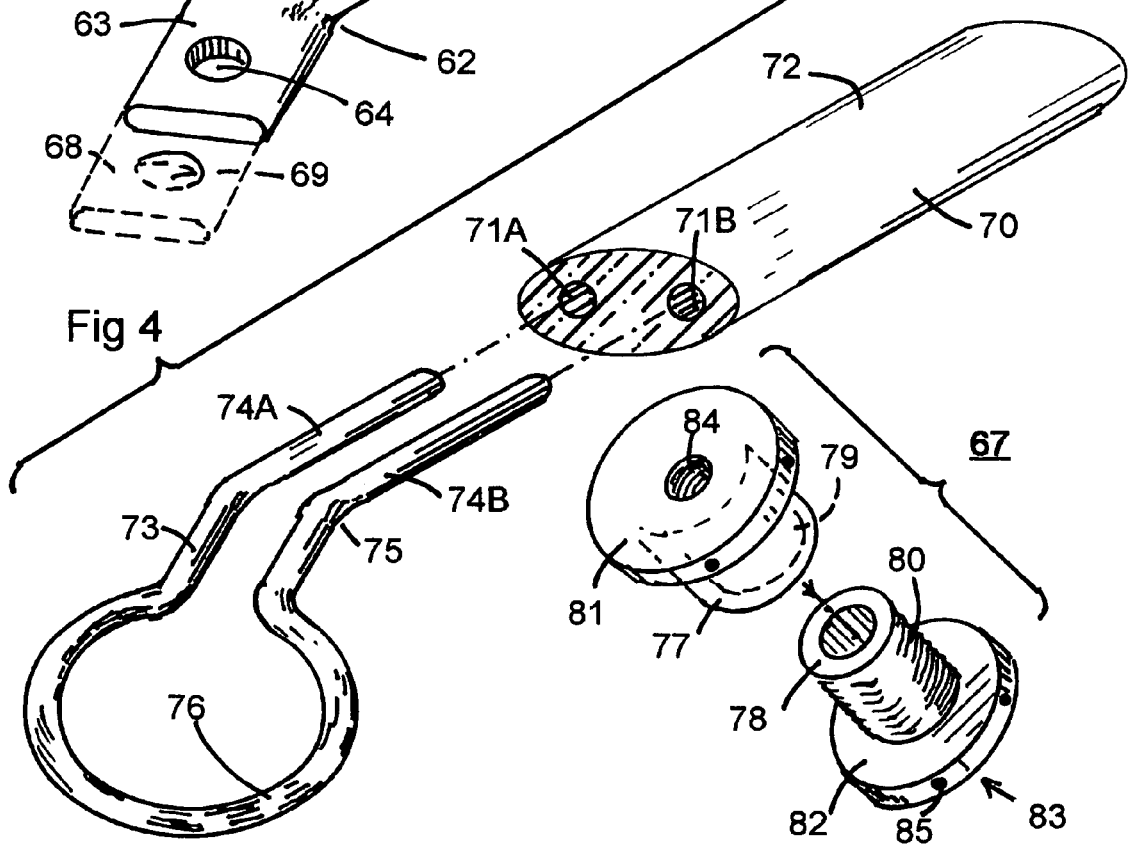

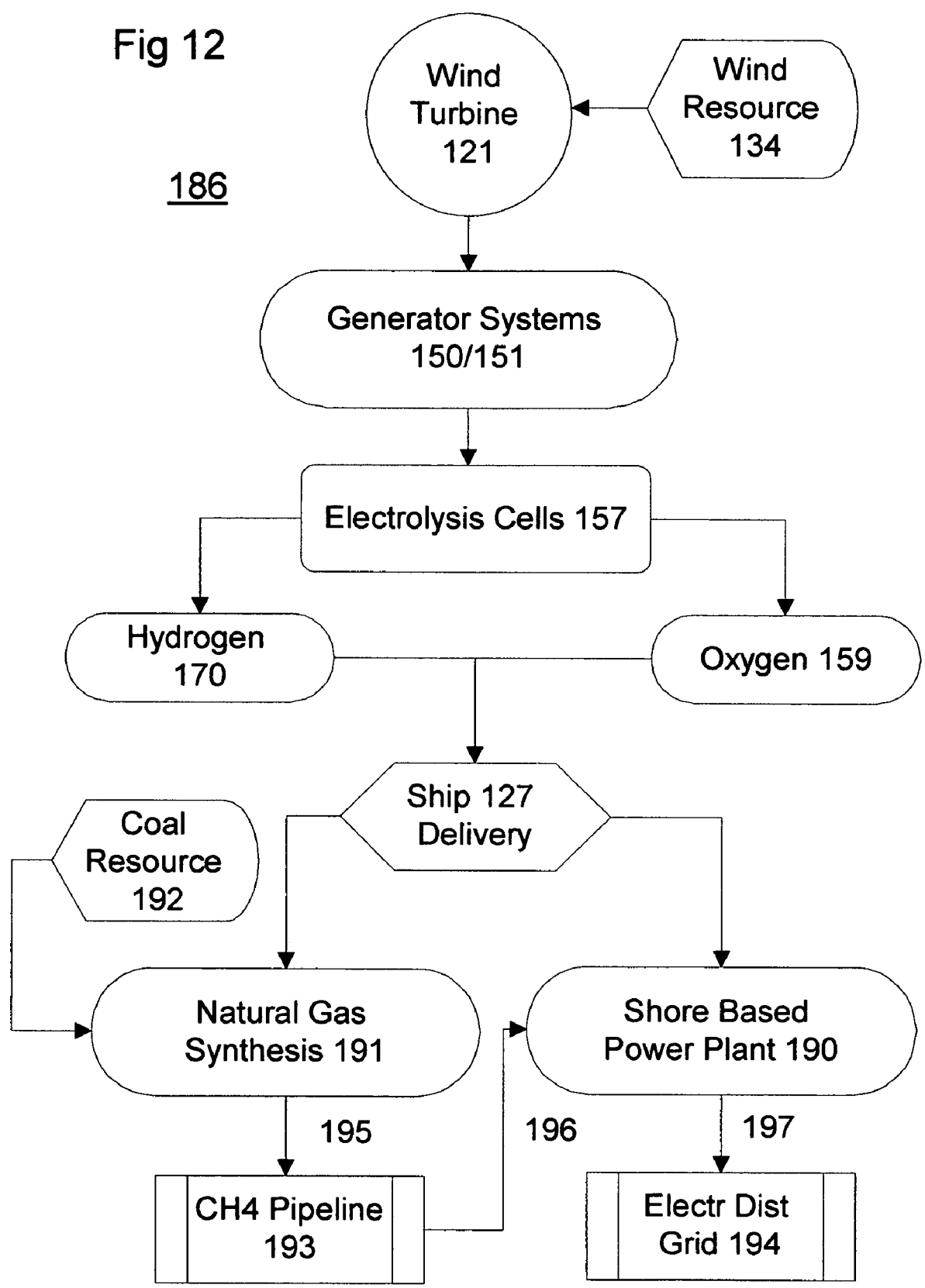

WIND TURBINE AND ENERGY DISTRIBUTION SYSTEM

BACKGROUND

1. Field of the Invention

This invention relates to wind turbines and energy systems, specifically to vertical axis machines and systems that have the capability to supply public energy needs in combination with existing infrastructure and equipment.

2. Prior Art

Large horizontal axis wind turbines have the lion's share of the current land based market. They also constitute the planning for off shore installations of very large (up to 5 MW) turbines. While many high value wind sites lie in mountain passes such as Tehachapi in California and Guadalupe in Texas they are limited in frequency and access to the grid. A host of attractive sites are found in the Great Plains, (called the 'Saudi Arabia' of wind), but lie a considerable distance from major population areas.

Just off shore of major population centers on the Atlantic, Gulf Coast, Pacific and Great Lakes lie wind energy resources that dwarf on-shore wind energy available by factors of up to 5:1. Recent DOE inquiries have focused on tall towers for islands to capture this resource. The difficulties of the Nantucket Shoals project, general use of the shoreline as a recreational/tourist resource and valid 'not in my back yard' sentiments of the public demonstrate the limitations of this direction of development. Another difficulty is integrating and connecting the variable off-shore wind resource to existing shore-based power plants that are the ties to the distribution grid.

As turbines get larger, the large moment of inertia in the three-blade horizontal axis design requires ever heavier composite cross-sections. Fiberglass thickness now reaches close to three inches for 1.5 to 2.5 MW production machines. The strength to weight properties of composites will limit the turbine size in the same way the size of dinosaurs was limited by the properties of bone. A planned developmental 5 MW turbine for off-shore installation in Germany will have 18 ton blades, even considering some use of high cost carbon fiber reinforcement. Production scale machines now so large that they need to be rotated whenever they pass below bridges.

Thinking in land based terms of ever larger turbines is not particularly useful within an ocean context where average wind energy can go from 500 W/m2 to 1000 W/m2 by moving slightly further off shore. The top-heavy design of horizontal axis mills and transmission to shore increases the cost of off shore installations by a factor of at least three over comparable land installations. Island installations have a more reasonable cost but are not scaleable in the sense that there are few opportunities available.

Within this context, Heronemous, (US App#2003/0168864) and Pflantz, (U.S. Pat. No. 6,100,600) have proposed gigantic, buoyed, off shore platforms for horizontal axis turbines to produce public power. Both are unique in generating hydrogen through electrolysis and utilizing heat to desalinate water; an important need in many areas. The former also features systems on the platform to produce methane, ammonia and liquid Hydrogen for transport by tender ship to shore. Placing large chemical production platforms off shore would seem to be more costly than placing them on land, and to invite the possibility of chemical spills in the aquatic environment. Working with liquid Hydrogen is just barely handled safely by NASA at the present time.

In addition to the limitations described above, the fixed position of the platforms, the ungainly array of multiple horizontal axis wind turbines and the turbulence experienced in large storms present the challenge of catastrophic failure such as that of the Putnam 1.5 MW installation in Vermont during WW II.

Also, from the perspective of public services, Bird, U.S. Pat. No. 6,083,382, presents a land based energy system using wind for water pumping to create a hydrostatic head for wind powered water purification. Most recently, a corporation formed around the work of Lackner et al (U.S. Pat. No. 6,790,430) has worked on the pollution free production of public electricity from coal. The work has been focused on the use of oil shale and is quite far from producing a viable public power system.

The first step of the Lackner process, however, (the hydrogenation of coal to produce methane), is a viable technology developed between the 1930's and 1960's (e.g. Schroeder U.S. Pat. No. 3,152,063). Implementation of the later technology, would go a long way towards the realistic goal of stabilizing global CO2 at 500 ppm (Browne), and could do so in a much shorter period of time and with better assurance of public safety than use of a totally Hydrogen based economy.

Earlier, Lawson-Tancred, (U.S. Pat. No. 4,274,010) developed an integrated horizontal axis system for producing heat and/or electricity based on hydraulic pumps to drive electric generators which in turn generate heat for storage or smaller amounts of electricity for on-site usage. Disadvantages of this approach were that heat could have produced directly from the fluid power and that the small scale of the installation could not effectively compete with utility based supply costs. In targeting direct production of heat, much of the cost and complexity of a wind system is reduced, allowing wind to more effectively compete in areas of modest wind energy resources.

In terms of ocean-based technology, Flettner (U.S. Pat. No. 1,674,169 & Foreign Patents) sailed a large Magnus effect powered ship across the Atlantic in 1925. Reducing weight on the top of the mast, a stable shipboard system was produced. In the 1980's Bergeson repeated this work retrofitting ships between 81 and 560 feet long with Magnus rotors, saving between 23 and 11% on fuel usage, (Gilmore).

These efforts did not put forward a systems approach to supplying public energy needs. Few designs have been put forward to collect off shore energy resources and deliver them by ship to shore based energy production and distribution infrastructure. The ability to do so also affords the opportunity to move to safe haven in the event of massive storms. It allows for scaleable and mobile systems that can respond to changing needs while also moving the production system for the most part out of everyone's 'back yard'.

The original Darrieus vertical axis wind turbine design (U.S. Pat. No. 1,835,018) had the advantages of moving the mass of the generator to the bottom, reducing overall weight of the structure, being omni-directional and having a relatively high tip speed ratio and efficiency. One early limitation was that it was not self-starting.

Original designs were formed from Aluminum extrusions with more potential for damaging deformation than composites. Recently, Wallace et al, (U.S. Pat. Nos. 5,499,904 and 5,375,324), developed a composite Darrieus blade produced through the lower cost pultrusion process. This process addresses a potential problem of conventional horizontal axis blades; mold form/lay up process can leave potential voids and hidden defects formed in the heavy wall polymerization process.

Wallace still uses conventional troposkein Darrieus geometry and has many of the limitations outlined for it. Wallace proposes bending into the troposkein geometry from a straight geometry on site, avoiding the transport problems outlined above, but perhaps creating others.

Another limitation in the Darrieus design was the lack of pitch control. Modifications to the original curved blade by Drees, (U.S. Pat. No. 4,180,367), Seki, (U.S. Pat. No. 4,247,253) and others resolved the perceived needs for a self-starting machine with pitch control. Despite the advantages of vertical axis wind machines, they did not perform well in applications directly linked to the grid and are no longer produced in the US. This may have been related to speed regulation, to structural weakness in the rectangular geometry of the cylindrical straight blade arrays or to a standardization on horizontal axis machines.

Additional references are included on forms PTO/SB/08 A & B, (attached).

OBJECTS AND ADVANTAGES OF THE INVENTION

Accordingly, several objects and advantages of the current invention are:
a) To provide a robust design for a vertical axis wind turbine or windmill that is capable of operation in a variety of wind regimes; Such as that of a ship mounted device to capture off-shore wind energy resources and a heat producing system for land based installations in areas having modest wind energy resources
b) To provide an energy production and delivery system capable of harvesting abundant off shore wind resources and delivering them in economically and technically useful forms to existing on-shore energy generation, distribution and use infrastructure, and
c) To provide a system that is scaleable and that can be implemented in a relatively short period of time in order to; relieve growing energy demand, improve energy independence and the environment.

Further objects and advantages will become apparent from examination of the specifications, drawings and claims of the invention.

SUMMARY OF THE INVENTION

The invention consists of a robust vertical axis windmill/turbine design based on dome structure spars as blade supports and blades. It can either be ship mounted or land based and operate in low (windmill) to very high (wind turbine) wind speed regimes. Driven devices for heat and electricity generation allow for production of site/district heating and Hydrogen for energy storage aboard a generator ship for delivery to shore based facilities. Integrated downstream equipment can use the Hydrogen for substitution or supplement of natural gas in conventional gas turbine electrical generation or production of natural gas for heating and transportation needs.

BRIEF DESCRIPTION OF THE DRAWINGS

FIG. 2 is a cross section through a blade strut making up the VAWT.

FIG. 3 is an isometric drawing of a first style of hub connector

FIG. 4 is an isometric drawing of a second style of hub connector

FIG. 12 is a process flow diagram of the energy capture and distribution system

DETAILED DESCRIPTION

Wind Turbine and Heating Systems

Figure 1:
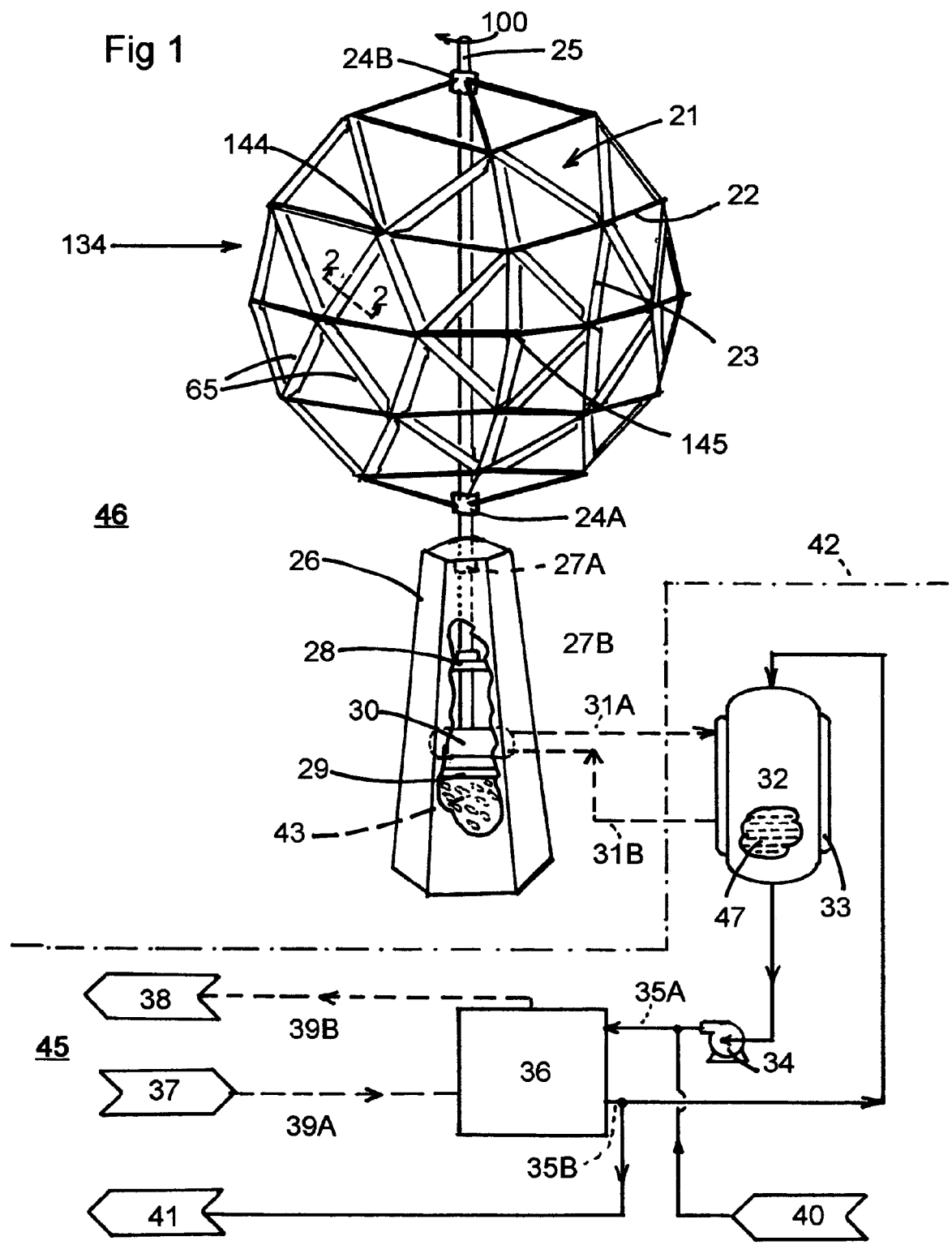
FIG. 1 is an isometric drawing of a land based vertical axis wind turbine (VAWT) coupled to the heating system of a building.

In the preferred embodiment of the invention, a wind energy resource 134 turns a novel vertical axis wind turbine 21 driving a thermal generator 30 to supply heat to a conventional heat pump system 45 for a commercial, industrial or agricultural building, (not shown). In areas of modest wind energy resources, an integrated wind heating system 46; allows for economical competition with the rising cost of natural gas, and the freeing of natural gas supply to uses such as electrical generation and transportation.

Turbine 21 is made up of a dome structure assembled from structural struts 22 and blade struts 23. (FIG. 1) The blade struts 23 all have leading edges 65 that are oriented in the same circumferential direction to reinforce rotation 100, (clockwise from above) of the turbine. The dome structure illustrated has octahedral symmetry with what is termed a three-frequency breakdown, (i.e.; each spherical segment is divided into three equal sections between the pole and the equator and each quarter of the equator is divided into three equal sections.)

Structural struts 22 are used wherever the component is roughly parallel to the equator of the dome. Blade struts 23 are used wherever there is a projection of the component on a meridian plane which can be used to generate lift and rotation of the turbine. The turbine is attached to a central mast 25 at an upper coupler 24B and a lower coupler 24A. Mast 25 passes into a segmented tower 26 and is supported by an upper bearing 27A and a lower bearing 27B. Tower 26 has internal platforms 28 and 29, which serve to stabilize the structure and delineate work areas within the structure. Thermal generator 30 is supported on platform 29 and mechanically driven by mast 25. Segmented tower 26 is preferably constructed through the methods and materials of U.S. patent application Ser. No. 10/624,363 to Hartman, (presently awaiting publication).

Figure 6:
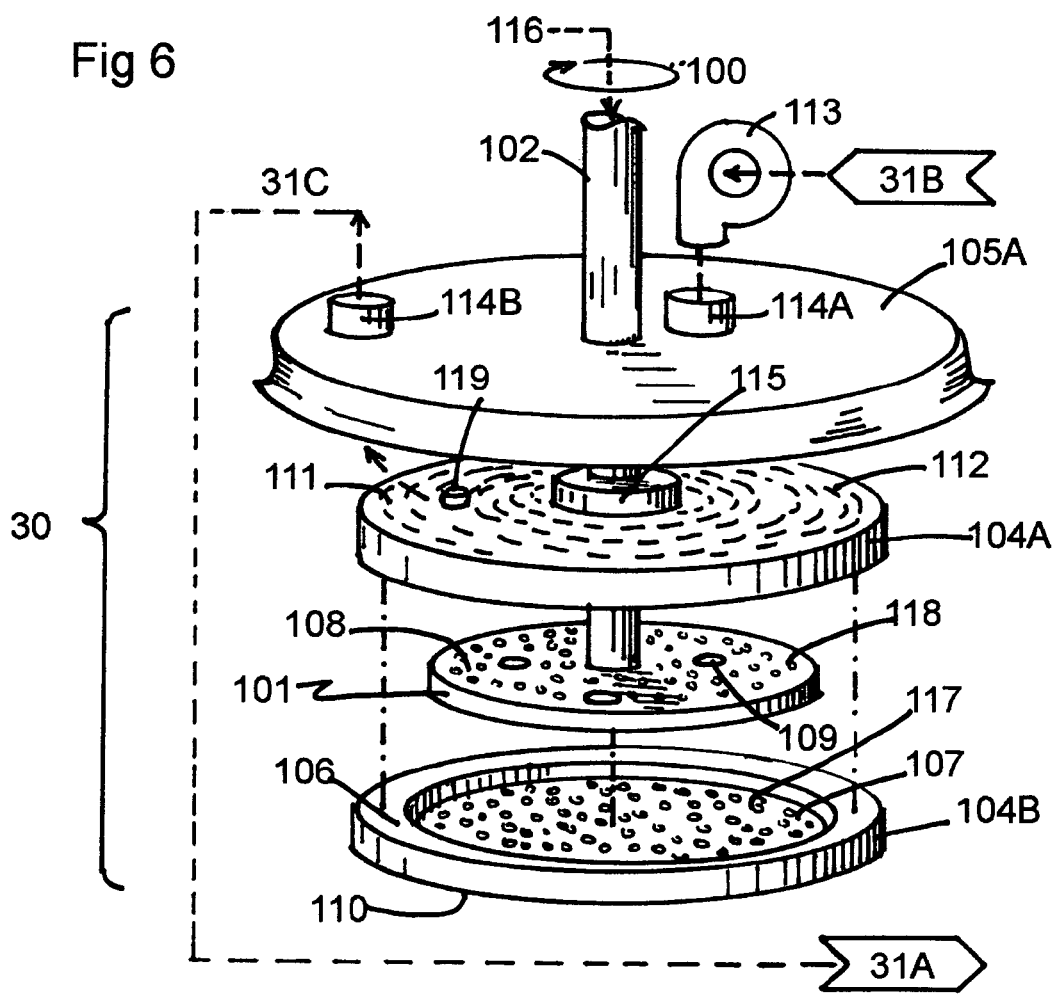
FIG. 6 is an exploded assembly drawing of a fluid friction thermal generator

Thermal generator 30 is shown in FIG. 6 as a shear type fluid friction device working on a contained viscous fluid 116. Heat is transmitted through an upper enclosure 104A and a lower enclosure 104B to a surface of extended fins 112 which heat a flow of supply air 31A which is sent to a standard HVAC system 45. A flow of return air 31B comes from system 45 and is reheated by the thermal generator.

An acceptable alternative to the thermal generator illustrated is a high pressure fluid pump driven by turbine 21 which generates heat passing the circulating fluid through a small diameter heat exchange coil, (not shown). In the case of heating for a greenhouse or other less critical application, the lower portion of tower 26 can be optionally used to contain a thermal storage medium 43 for subsequent supply to the application. Flow 31A would then be directed through the medium for heat storage within the tower. Some preferred materials for the medium would be rocks and aluminum metal, (because of the high specific heat capacity).

A schematic of HVAC system 45 is bounded by fence line 42, and would likely be contained within the commercial or industrial building served by the system. Thermal storage tank 32 contains water 47 as the primary heat transfer medium and is fitted with a heat exchange jacket 33. Flow 31A passes through jacket 33 before returning to the thermal generator.

Water 47 is supplied to a circulation pump 34 which in turn supplies heated water to the coil of a water source heat pump 36 and then returns the water to tank 32. Heat pump 36 receives a flow 39A of return air 37 from the building, conditions it and circulates a flow 39B of supply air 38 to the building.

An alternate source 40 of supply flow 35A could be used by heat pump 36 and returned (flow 35B) to the alternate source 41 for reconditioning. A preferred alternate source for summer cooling would be a geothermal loop. Preferred alternate sources for heating would be a natural gas heated or solar heated loops.

In this dome design layout, (FIG. 9), three lengths of struts are required. Equatorial struts 141 have a length of 0.259 times turbine diameter. Central struts 142 have a length of 0.325 times the diameter. Corner struts 143 have a length of 0.353 times the diameter. (36) equatorial struts, (48) central struts and (24) corner struts are used in the illustrated turbine.

It is not desired to limit the invention to the particular dome geometry illustrated, as any dome geometry could be used to implement the invention on virtually any scale desired. Dome geometry is useful in distributing dynamic and static stress throughout turbine 21 as opposed to the massive centrifugal force normally borne by the blade root/nacelle connection of typical three-blade horizontal axis wind turbines.

FIG. 2 is a cross section through a blade strut 23A showing both the structure of blade struts and structural struts. An elliptical tube 50 is integrally produced with transition sections 51A and 51B, which later join to form a blade section 52. It will later be shown that some deflection of the blade section, (indicated by arrow 54), is desirable in operation. This can be controlled through adjustment of the blade materials, the thickness 53 of the blade section, or as shown in FIG. 4, through engineering the nature of a hub connection 144 (FIG. 9) between struts.

Figure 9:
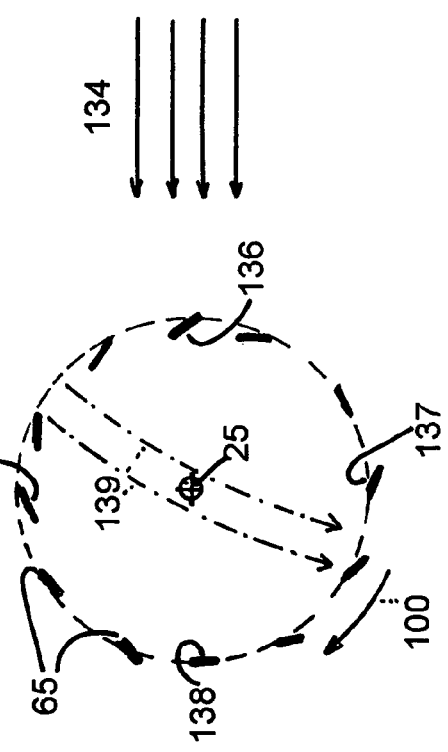
FIG. 9 is a schematic/layout of dome-turbine geometry

Dashed line 56 shows how a structural strut 22A would be produced as a matching elliptical tube with the transition sections and blade section omitted from the construction. Both the blade strut 23A and the optional structural strut 22A have an internal surface 55 and an assembly adhesive 57 which are used for mounting end connections. (FIGS. 3, 4, 9). The preferred material for both types of struts is a flexible fiberglass reinforced thermoset plastic. Alternatives are carbon reinforced plastic, chopped fiber reinforced thermoplastics, and metal extrusions.

Beyond the mast couplers 24A and 24B, turbine 21 is assembled at a number of six strut hubs 144 and four strut hubs 145. (FIG. 1) FIG. 3 shows a rigid hub connector 58 composed of a metal tube 59 and a bar section 61. Bar section 61 is joined tube 59 by a near adapter 60A at the viewer end and a far adapter 60B at the far end. In each case, the bar section, adapter and tube are welded together, (welds not numbered). Bar section 61 is bent at point 62 to allow for a tab section 63 perpendicular to the vertex of either hub 144 or hub 145, (FIG. 1). Through hole 64 is designed to accept a conventional fastener, (not shown), which is used to make up the hub assembly in the field. Outside surface 66 of tube 58 is sized for a sliding fit into internal surface 55. During manufacture of the struts, through holes 64 can be used to precisely size the length using reference pins, (not shown), while adhesive 57 is curing.

Figure 5:
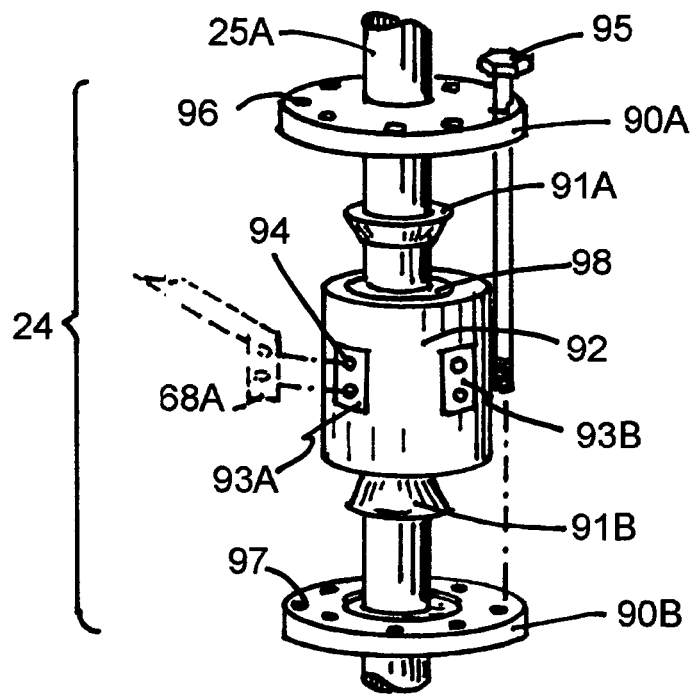
FIG. 5 is an exploded assembly drawing of a turbine to mast coupler unit

Optionally, tab section 63 would be extended out to section 68, having a second through hole 69 for connections to couplers 24, 24A and 24B. Ideally, the length of tube 59 would also be extended in this case to add strength to structural strut 22A. As shown in FIG. 5, both through holes would be used to anchor the struts to the couplers.

FIG. 4 shows an alterative hub connection system which allows for flexion of blade struts relative to the fixed position of the hubs. Elliptical adapter 70 carries two through holes 71A and 71B. Outside surface 72 is also sized for a sliding fit into internal surface 55. Ring adapter 73 is formed from light rod or heavy wire on a four axis spring machine into two arms 74A and 74B that are congruent with through holes 71A and 71B. Arms 74A and 74B are bent at point 75 into a plane perpendicular to the vertex of either hub 144 or hub 145, and rolled into ring section 76, which functions as the connection point to form the hubs.

A spool piece 67, (not to scale) is field assembled from a cap 77 and a plug 78. Cap 77 has internal threading 79 which matches locking threads 80 on plug 78. Ring sections 76 from the struts at the field assembled hub (144 or 145) are contained by flange sections 81 and 82 during assembly. Span wrenches, (not shown), can engage holes 85 and the outside diameter of the flange sections for final tightening.

As an additional locking component, a bolt or eye bolt 83 with threading direction opposite that of locking threads 80 can be used to engage threads 84 on cap 77 to prevent release during operation. Eye bolt 83 would be the preferred configuration where a cable stay (not shown) to prevent turbine rotation would be needed and as a tether point for securing the trailing edge of a fabric or film based sail, where sails would be used in conjunction with the dome turbine.

Figure 7:
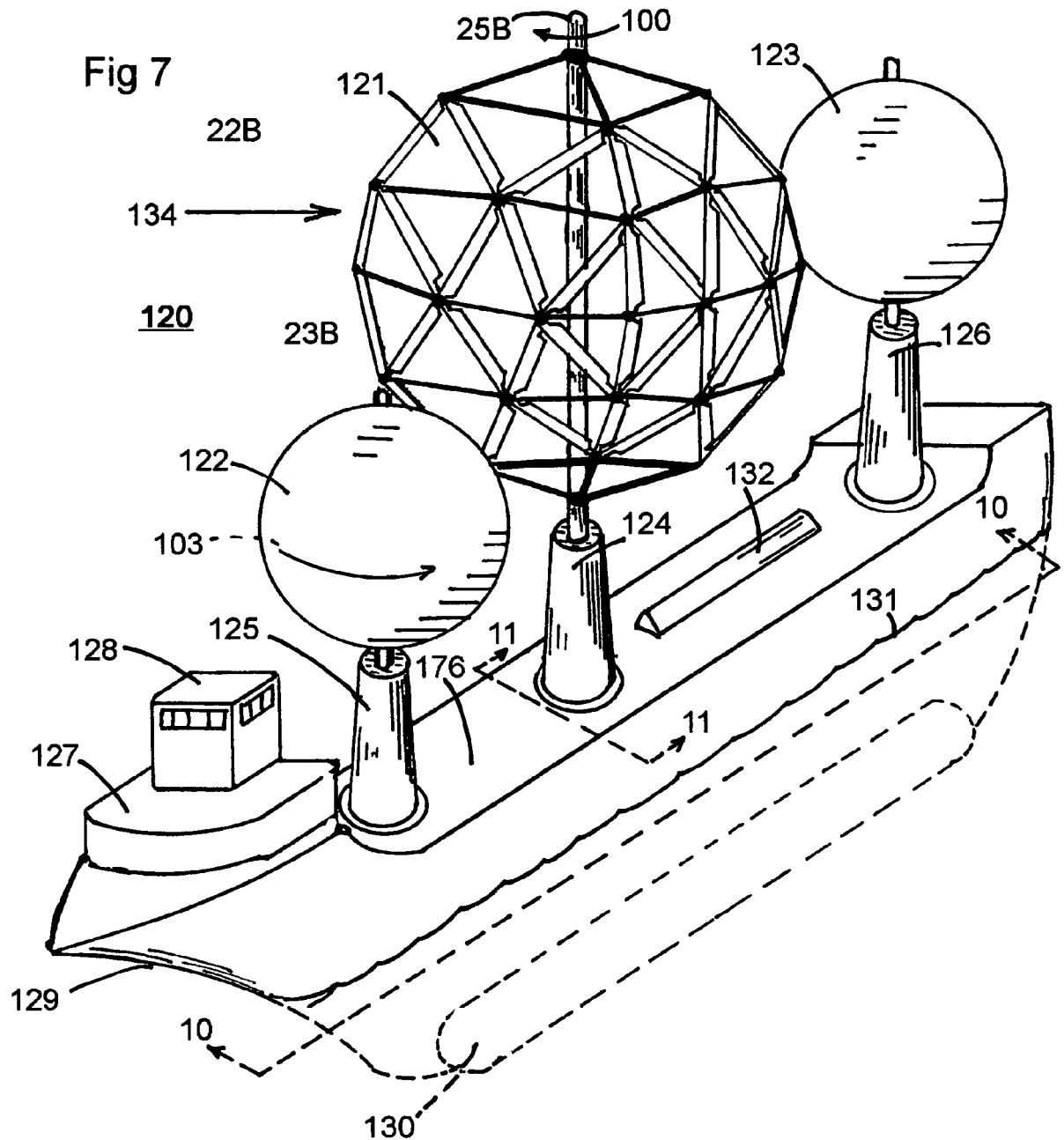
FIG. 7 is an isometric drawing of a ship based energy capture and delivery system
Figure 8:
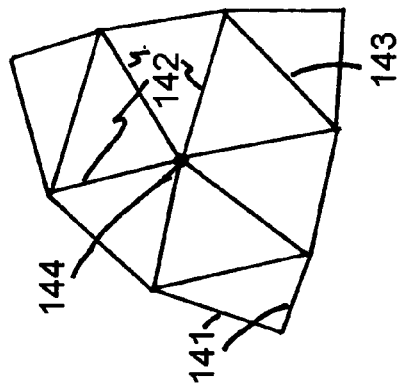
FIG. 8 is a schematic illustrating wind turbine function

The preferred material for ring adapter 73 in cases involving corrosion (e.g. FIG. 7) would be tempered Titanium. An acceptable alternative in other applications would be spring steel. In both cases, the axis of the blade strut could rotate relative to a fixed hub position during turbine rotation as shown in FIG. 8. The preferred material for rigid connector 58 would be stainless steel in corrosive applications. Aluminum or a thermoplastic material for use with thermoplastic blade struts would be acceptable alternatives.

Specialized Components

FIGS. 5 and 6 illustrate specialized components to realize the vertical axis wind turbine and the wind heating system of the present invention.

Mast 25, shown as 25A in FIG. 5 is preferably produced as a resin fiber composite in order to confer light weight and flexure resistance on the turbine 21/tower 26 assembly. Coupler 24 represents couplers 24A, and 24B in FIG. 1 and the turbine to mast couplings (not numbered) in FIG. 7. The assembly shown in FIG. 5 is one approach to connecting a rotating member to a composite shaft without direct use of threaded holes in the composite. It is roughly based on the many types of compression fittings currently in use in the plumbing industry.

Flanges 90A and 90B are the compression members that form the outside of the assembly. Flange 90A has through holes 96 for passage of assembly bolts 95, (only one shown here), and flange 90B has tapped holes 97 for connection to bolts 95. Spool piece 92 has a through hole for mast 25A, (not shown), and conical ledges 98 at the top and bottom for receipt of compression rings 91A and 91B. It also has a series of strut flats, illustrated here as 93A and 93B to be used as attachment points for rigid strut connectors as shown in FIG. 3. In the particular example illustrated spool piece 92 has four strut flats, (the number could easily be adapted to any desired dome geometry). Tapped holes 94 are provided at each strut flat for receipt of strut assembly bolts, (not shown) passing through holes 64 and 69 in the field assembly of turbine 21 to mast 25, mast 25A, or mast 25B (FIG. 7). Flats 93A and 93B can be countersunk to allow for better registration of struts and to relieve shearing stress on these strut assembly bolts. Spool piece 92 is preferably made from metal, aluminum for non-corrosive applications or corrosion resistant steel for corrosive applications. Both flanges 90 and spool piece 92 can be easily produced on multi-spindle machining centers.

After assembly of coupler 24 using bolts 95, flanges 90A and 90B urge rings 91A and 91B into locking contact with mast 25A as the rings are deflected by conical ledges 98. A choice of hard composites as the material for rings 91 would result in a tight connection to the mast. This might be desirable in upper coupler 24B, as this might not be often removed.

Softer thermoplastic as the material choice for rings 91 might be desirable in order to have a more easily loosened coupler. Turbine 21 could then be lowered on mast 25 after removal of lower structural struts 22 attached to coupler 24A, thus allowing for repair and maintenance of turbine 21 closer to the ground. In the reverse of this operation, turbine 21 could be assembled around tower 26, using the tower as a sort of scaffolding, then attached using coupler 24B to mast 25. The final operation in assembly would be raising mast 25 from inside the tower, (not shown), and assembling lower structural struts 22 to coupler 24A. In this manner, a very large wind turbine might be assembled with a minimum of heavy crane equipment.

Earlier methods of composite assembly used direct insertion of metal fasteners through the composite, resulting in ultimate failure either due to wearing and subsequent cracking of the composite parts.

FIG. 6 is an assembly drawing of thermal generator 30 from FIG. 1. It provides a dedicated assembly for generating fluid friction heat that cuts the cost of conventional electrical systems. It also represents a unique driven device for a wind turbine in the sense that the load is automatically increased in proportion to the power available in increasing winds. Hollow drive shaft 102 is secured to friction disc 101 and rotates (arrow 100) with it. While shown as a single disc in the illustration, the system could also be realized with multiple discs running off of the shaft.

Disc 101 is contained between upper housing 104A and lower housing 104B, with a specific gap, g, (not shown on the drawing) between the housing inside surfaces 107 and the face surfaces 108 of disc 101. Disc projections or roughness 118 are applied to surfaces 108 and housing projections or roughness 117 are applied to surfaces 107 in order to allow for effective momentum/heat transfer to working fluid 116 which is filled into gap g, through the center of shaft 102 during equipment setup. During manufacture, upper housing 104A is preferably assembled to lower housing 104B through welding raised flanges 106 of both housings together. Shaft 102 is held in fixed position relative to this housing assembly using bearing seal pack 115 mounted in upper housing 104A.

During setup of the generator 30A, fluid 116 fills the lower gap between housing 104B, moves up through periodic holes 109 in disc 101, then displaces the air between disc 101 and upper housing 104A emerging from a coupling fitting 119 in housing 104A. Fluid 116 can then be sealed with either a plug (not shown) or a fluid expansion fitting, (not shown) threaded into fitting 119. Outer surface 111 of the upper housing and outer surface 110 of the lower housing carry annular extended surface fins 112 which serve to facilitate heat transfer to air flow (from storage) 31B.

The entire assembly is enclosed between a pair of insulated sheet metal housings 105A and 105B (not shown in drawing) which serve to direct and contain air flow across outer surfaces 110, 111 and fins 112. In this case, a blower 113 feeds air through a first stove pipe connection 114A across surface 111. Air emerges from connection 114B as flow 31C and is fed through a similar set of connections in lower housing 105B (not shown), then to emerge as flow 31A returning warmed air to thermal storage.

Fluid friction wall stress for turbulent flow within a closed conduit or chamber is generally proportional to velocity squared, with fluid friction power consumption being proportional to velocity cubed. As wind power available varies according to wind velocity cubed, vertical turbine 21's output would track the power consumed by coupled thermal generator 30, resulting in a largely self-controlling system without the use of mechanical braking or feathering.

Additional design sophistication might be introduced through allowing starting velocity for turbine 21 to occur at a laminar flow situation within generator 30, with transition to a turbulent flow regime occurring at the mid-range of wind speed. This would allow for capture of more prevalent low wind speeds, while also protecting from over-speed by power consumption in a turbulent fluid friction regime.

Direct drive a lower cost thermal generator removes the high costs associated with electrical generators mounted at the top of conventional horizontal axis machines, the associated cost of heavier tower support and electrical power conditioning. It serves the needs of a large variety of potential customers by providing heat at a low cost to an established HVAC system serving a building.

Energy Capture and Distribution System

FIGS. 7, 9, 11 and 12 illustrate an alternate embodiment of the invention in the form of a ship based system for capturing abundant off-shore wind energy 120 and an energy capture and distribution system 186. A wind energy resource 134 works through system 186 to supply public needs through an electrical distribution grid 194 and a natural gas pipeline 193. The completed systems offer the opportunity to reduce CO2 emissions through the displacement of coal and gasoline with natural gas and Hydrogen and to capture abundant off-shore wind energy in an economical fashion for the general public good.

FIG. 7 is a perspective drawing of a ship 127 carrying three wind turbines similar to turbine 21 in FIG. 1. Main turbine 121 is mounted mid-ship with smaller turbines 122 and 123 mounted forward and aft. Turbines 122 and 123 are illustrated as simple spheres for drawing simplicity, and are dome-turbines like 21 and 121 in practice. Turbine 121 rotates clockwise from above, (arrow 100) while turbines 122 and 123 rotate counter-clockwise (arrow 103) to give gyroscopic stabilization to the ship, and to more effectively utilize wind moving between the three turbines, (not numbered).

Figure 10:
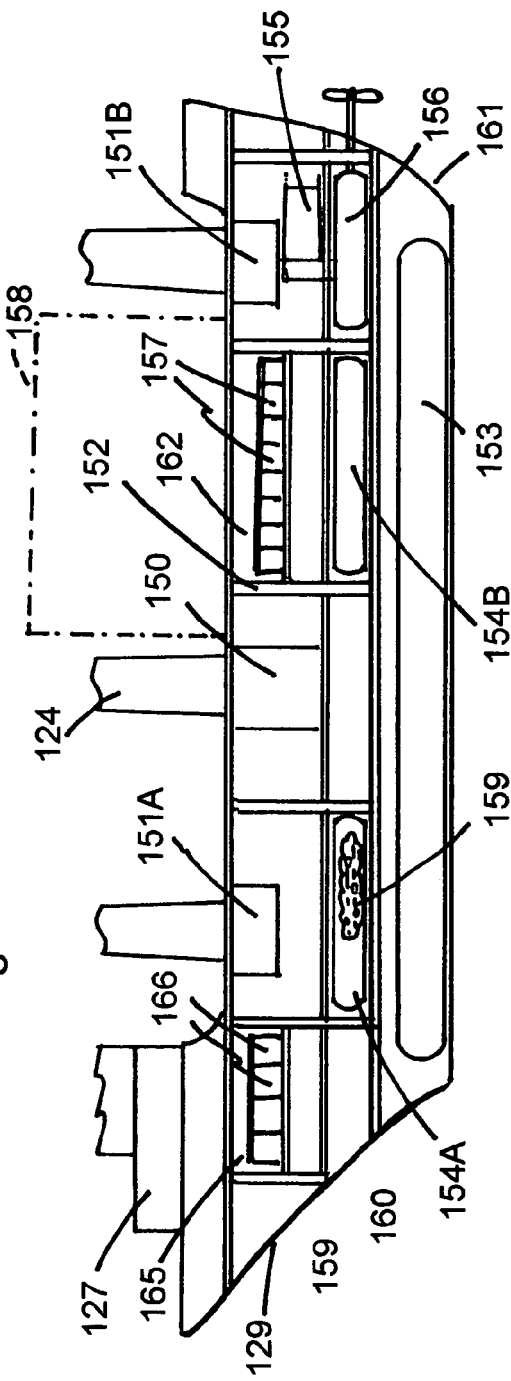
FIG. 10 is a cross section of mechanical components in the ship based system of FIG. 7

All three turbines are mounted on tubular towers 124, 125 and 126 which in turn are secured to the main deck 176. An unloading equipment enclosure 132, containing Hydrogen unloading equipment (not shown) is also mounted on the main deck. Below the waterline 131, the hull of the ship is modified to include a nacelle 130, which in turn protects a Hydrogen storage tank 153, (FIG. 10). The ship's bow 129 and stem 161 extend beyond nacelle 130 to further protect storage tank 153 from collision damage.

FIG. 10 is a mechanical detail cross section of ship 127. Below the main deck, tower 124 connects with a primary gearing and generator set 150. Similarly, forward turbine 122 connects with a secondary generator set 151A and aft turbine 123 connects to a secondary generator set 151B. Most equipment is mounted on an equipment deck 159 and a lower deck 160 supports auxiliary tanks 154A, 154B, (other auxiliary tanks not shown) and ship drive gearing 156. A series of bulkheads 152, separate compartments with different electrical and chemical functions such as primary generator 150 and electrolysis bay 162. Electrolysis cells 157 for electrically splitting water into Hydrogen and Oxygen are mounted in bay 162 and in a forward bay (not numbered). An example of a commercially available cell 157 is the Hogen RE from Proton Energy Systems, distributed by Praxair.

Alternatively, a forward bay 165 could be used with conventional storage batteries 166, to store power provided by generator sets 150, 151A or 151B. This could either be used to provide utilities for the crew or to provide electric propulsion (not shown) for the ship. While not a direct objective of the invention, wind electric propulsion of ships would build on the proven energy savings demonstrated by Bergeson in the earlier discussed Flettner rotor work of the 1980's; particularly considering the small relative area of the Flettner rotors used compared to the size of wind turbines 121, 122, and 123.

An optional wind deflector 158 is shown mounted to deck 176. In practice it would serve to increase wind speed to the turbines by deflecting wind flow upward. It would be constructed from two halves, hinged to the deck and forming an A frame in use. The wind deflector would be actuated by hydraulics (not shown) to serve as a wind deflector at sea and flattened as a loading ramp or platform in dock. The flattened wind deflector might also serve as a heliport platform or personnel platform for transfers on and off the ship at sea.

Drive turbine 155 is mounted on equipment deck 159 and serves a dual function on the ship. Firstly, it is used to propel the ship off-shore and back to port. Secondly, through the drive gearing 156, is can be used to power gas compression equipment (not shown) to take Hydrogen product 170 from electrolysis cells 157 and pressurize it to 6,000 to 10,000 psi for storage in tank 153. Drive turbine 155 is configured as a dual fuel unit that could either run from Hydrogen 170 or liquefied natural gas that could be stored in one of the auxiliary tanks 154A, or 154B. If desirable from a economic standpoint, Oxygen 159 might optionally be stored in an auxiliary tank after compression at the outlet of electrolysis cells 157. An example of a commercially available electrolysis cell 157 is the 'Hogen RE' from Proton Energy Systems.

Figure 11:
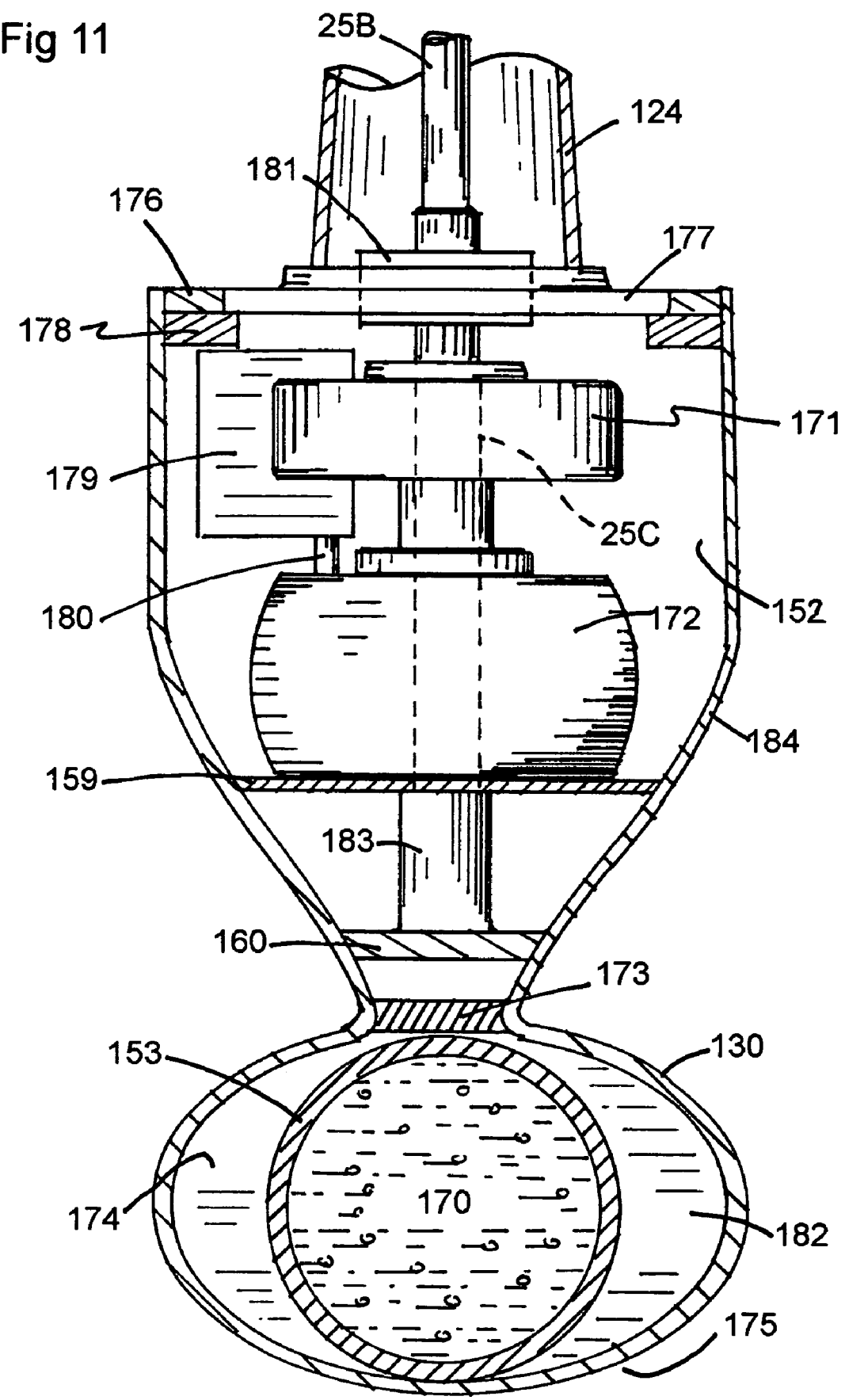
FIG. 11 is a cross section of the generator/Hydrogen storage components of the system

FIG. 11 is a cross section showing details of the power distribution and storage system. Mast 25B is supported by bearing 181 and is attached to gear box 171 by means of a flange adapter, (not numbered). Gearbox 171 increases rotational speed and transmits power to primary generator 172. Electrical power from generator 172 is transmitted via wiring/conduit 180 to power conditioning equipment 179 and from there to electrolysis bay 162 and various other shipboard requirements. The use of a modern, synchronous, variable speed generator such as the NW 100/19 from Northern Power Systems would eliminate the need for gearbox 171.

Hydrogen gas 170 is supplied by electrolysis cells 157 and stored at high pressure in tank 153, preferably a heavy walled alloy vessel resistant to hydrogen attack. Tank 153 is protected from impact damage by nacelle 130 which is an extension of hull 184. Compression plate 173 and gussets 182 further protect tank 153 from damage. Optionally, area 174, between gussets 182, nacelle 130 and tank 153 could be used for purified water feed storage (not numbered) to methods and materials of U.S. Pat. No. 6,959,520 to Hartman.

One of the key problems in realizing a Hydrogen energy economy has been the weight of energy storage for automobiles. In this application the weight of the Hydrogen storage equipment applied at keel 175 of ship 127 serves to stabilize the vessel in the heavy weather it is designed to utilize in the generation of wind power. The gyroscopic effect of the wind turbines would also work to stabilize the ship if turbines 122 and 123 were designed to be counter rotating to turbine 121.

Like the wind heating system, mast 25B is designed to have the capability of lowering for repairs to turbine 121. In this case a passage 25C is provided for the mast through gear box 171 and generator 172 for the mast to be lowered into receiver 183 and to stop at lower deck 160. In order to provide for repair and upgrades to the generator and gear train in port, main deck 176 is perforated in the area of tower 124 which is mounted to an access plate 177. Plate 177 is secured to a support plate 178 with a series of bolts, (not shown) and may be removed by a crane in port to allow for repair and replacement of generator 172 and/or gear box 171.

A complete energy capture and distribution system 186 is displayed schematically in FIG. 12. Wind turbine 121 captures an off-shore wind energy resource 134 and converts it to electrical power through generator systems 150 and 151, (A&B). On-board electrolysis cells 157 produce Hydrogen 170 and Oxygen 159 which are stored on board and transported by ship 127 to port. Hydrogen 170, (and optionally Oxygen 159) are unloaded at an existing shore based power plant 190 and burned in a conventional gas turbine, in combination with natural gas 196. The power plant supplies high voltage electricity 197 to an existing power grid 194 for public use.

Areas with abundant off-shore wind energy resources having significant populations and industrial base, such as the Atlantic seaboard, lakes Erie and Ontario, the Gulf Coast and the West Coast could be provided with significant electrical power. This would be achieved without large amounts of objectionable, inefficient (because of low shore based wind speeds), wind turbines located near the populated areas and also without the very high cost and potential large storm instability of off-shore platforms.

Alternatively, Hydrogen 170 can be provided to a natural gas synthesis plant 191, operating according to the process of Schroeder (U.S. Pat. No. 3,152,063) or more recent researchers to hydrogenate a coal resource 192 to produce methane 195 ($CH_4$, or natural gas) and other light hydrocarbons. From plant 191, the methane is fed to a pipeline 193 for public use. From this perspective, the national energy grid would be stabilized through providing for sources of natural gas at points that would normally be users.

Operation and Implementation

FIGS. 8, 10, 11 and 12 delineate the operational details of the vertical axis wind turbine and the energy capture and distribution system.

Early experiments with a 'sail cloth' version of the dome turbine configuration shown here as turbine 21 and turbine 121 yielded the information shown in FIG. 8. Wind resource 134 coming from any direction is seen to deflect sails 135 (approaching the wind source) toward the center of the dome. Conversely, sails 137 moving away from the source are deflected outward from mast 25. This leads to the conclusion that there is an internal flow 139 moving across the direction of wind resource 134 from what might be construed as a higher pressure/lower velocity flow at sail 135 to a lower pressure/higher velocity flow at sail 137.

In the early sail cloth version, each sail was composed of polyethylene film wrapped around a strut at it's leading edge 65A, and tethered with string to a hook at a hub opposite to that leading edge. (not shown). Struts were composed of ¼" dowel material, and the sail cloth version easily held up to test winds in excess of 45 mph.

Because the turbine is rotating about mast 25, (arrow 100), internal flow 139 might be taken to imply somewhat of a Magnus effect was at work. A later experiment with round tubular struts showed that this vertical axis wind turbine design was self-starting and would rotate with a wind resource 134 having neither blade shaped struts nor sail cloth attached to struts. This appeared to be further confirmation of the Magnus effect at work in the design, and offer the promise of improved performance with the blade struts 23, 23A, and 23B shown in the earlier figures. The self-starting characteristics of the invention overcome the earlier limitations of Darrieus vertical axis turbines without the complex mechanical linkages present in the subsequent designs of cylindrical arrays of straight bladed machines, (e.g. Drees, Seki).

In the intermediate positions during turbine rotation, sails 136 and 138 in the early experiment had intermediate deflections toward and away from the mast. Designing blade flexure into the blade section 52 (FIG. 2) and/or the ring adapter 73 (FIG. 4) seems to be an effective way to capitalize of the deflections and lift forces available at work in the system.

Based on the preceding information, it is not desired to limit the invention to a particular blade geometry as the invention has been utilized with both sail cloth blades and with a dome structure composed of simple round tubular struts. The blade geometry illustrated in FIG. 2 may represent, however, a preferred configuration in terms of turbine aesthetics, ease of assembly, cost/efficiency and environmental concerns. It is also likely that the observed performance of a sail cloth version of the invention utilized the 'jib effect' where pressure is reduced on a following sail by a leading sail (Billings), thereby improving performance of the following sail.

A 'sail cloth' configuration comprising plastic film based sails wrapped around struts 122 and tethered at the trailing edges to eyebolts 183 secured to nearby hubs, (not shown) would be an economical and highly compactable system for providing power to explorations on Mars, (using the thin Martian atmosphere to fill the sails), or the Moon, (using the solar wind of particles and radiant flux from the sun as the 'wind energy resource').

Based on known characteristics of Dutch Four Arm windmills and curved blade Darrieus wind turbines, the new turbine might be expected to have an optimum tip speed ratio of four times incident wind velocity and an overall efficiency of about 35%.

Using typical values for wind energy resources off the US East Coast, a main turbine diameter 200 ft and a 'harvesting time' of two weeks off-shore; ship 127 could collect about 400,000 kWh of electricity and produce just under 2,000,000 std cubic feet (SCF) of Hydrogen. At a pressure of about 9000 psig, tank 153 would have an estimated diameter of 5 feet and a length of 180 feet. One to three ships could supply the average, (about 500 MW), shore based power plant 190 for two to four hours. Depending on desired mix of Hydrogen 170 to natural gas 196 burned in the power plant turbine, between 100 and 500 ships could sustainably support power plant 190.

From an environmental perspective, natural gas 195 emits 14.4 units of carbon per unit of energy, while gasoline (not shown) emits 19.2 units of carbon and coal 192 emits 25.7 units of carbon. Displacing natural gas usage with wind heating system 46 would eliminate carbon ($CO_2$) emissions in the buildings served and free up use of natural gas to displace coal and it's emissions in electrical generation and gasoline and it's emissions in the transportation sector. Within the transportation sector, using methane to power hybrid automobiles would be a rather easy fix to improve the already low emissions of this developed technology.

Replacement of methane and coal in the power generation sector with Hydrogen through energy conversion and distribution system 186, would remove present $CO_2$ emissions as it was employed. Wind heating of green houses would also save significant amounts of natural gas.

From an implementation perspective, these approaches to resolving parts of the energy crisis can draw on established components and infrastructure: 1) Existing turbine based electrical power plants. 2) Existing electrolysis equipment 3) Existing electrical generators 4) Existing pultrusion equipment for the production of blade struts 23 and structural struts 22, 5) A variety of coal 192 to methane 195 technologies developed over the years, and 6) Existing hybrid automobile technology. Energy system 186 could therefore be implemented in a relatively short period of time.

In World War II, with a scant technology and economic base to build on, more than 5500 merchant marine ships were built in five years. (Tassava). It is not unreasonable to assume that the inventions described herein could be implemented in a shorter period of time than an entire Hydrogen economy, including a hydrogen filling station infrastructure. The present inventions not only represent a practical first step toward energy independence, but a practical use, with reduced environmental consequences, of the coal resources available in the US: Methane emits 44% less $CO_2$ than coal and 25% less $CO_2$ than gasoline for the same amount of energy produced Using Hydrogen as an energy transport and storage media in conjunction with an existing utility infrastructure allows for an easier social transition to an environmentally friendly system without establishment of Hydrogen filling stations for automobiles and saves the expected 15 to 30 year delay in implementing fuel cell based automobiles.

I claim:

1. An apparatus for conversion of a wind energy resource into rotational power comprising:

a base;

a rotating mast adapted to rotate about a generally vertical axis in a set direction of rotation; and a vertical axis wind turbine for converting said wind energy resource into rotational power, said vertical axis wind turbine having;

a plurality of struts, each said strut having an exterior surface and an interior surface, said struts elongated in a first direction and transverse to said direction of elongation having a constant cross section adapted to capture said wind energy and having lengths to conform to a largely spherical dome framework design, said struts attached to one another at hubs according to said framework design by means of a hub connection system and with the assembly of said struts and said hub connection system forming a dome framework with a largely spherical shape having an equatorial plane and poles normal to said equatorial plane, said plurality of struts comprising a number of blade struts, each said blade strut having a leading edge oriented toward said direction of rotation, said constant cross section adapted to capture said wind energy having an elliptical section positioned at said leading edge and having two integral transition sections emerging from the minor axis of said elliptical section, said transition sections joining spaced apart from said elliptical section and said blade strut having a roughly aerodynamic shape at said exterior surface, said plurality of struts optionally including a number of structural struts, each structural strut having a tubular elliptical cross section with the major axis of said tubular elliptical cross section oriented roughly tangential to said largely spherical shape, said internal surface of said structural strut adapted to engage said hub connector system, with polar struts aligned toward said poles engaging coupler means; said coupler means having the capability to position said turbine on said mast and the capability to lock said turbine to said mast and transmit said rotational power to said mast, whereby; said wind energy resource can be applied to said struts through nearly the entire rotational circuit of said turbine to produce rotational power at said mast.

2. The apparatus of claim 1, wherein said coupler means comprise;

two outer flanges having a central aperture for through passage of said mast and connector means for tightening said outer flanges about a central spool piece, a pair of compression rings placed between said outer flanges and said spool piece, said rings each carrying an aperture for passage of said mast and having a conical surface which faces toward said spool piece, said spool piece being roughly annular in nature, having an inner diameter which allows passage of said mast and an outer cylindrical surface carrying a series of strut flats, said strut flats having engagement means for locking said polar struts to said spool piece, said coupler means having an unactuated state and an actuated state, wherein said connector means hold said outer flanges to said spool piece and said compression rings hold said wind turbine in locking contact with said mast when in said actuated state.

3. A wind heating system, wherein the apparatus of claim 1 supplies said rotational power is coupled to a thermal generator producing with an output a fluid containing additional heat, said output fluid connected to thermal storage means containing a thermal storage medium.

4. The heating system of claim 3, further including a heating plant comprising;

circulating means for moving said thermal storage medium from said thermal storage means through a working loop and returning said medium to said thermal storage means, said working loop comprising at least one heat pump, said at least one heat pump having coil component means for removing said additional heat from said thermal storage medium and also having heat transfer means for moving said additional hear to a process fluid.

5. The wind heating system of claim 3, wherein said thermal generator comprises;

at least one rotor disc coupled to a drive shaft engaging said mast;

said at least one rotor disc contained and free to rotate between at least two stationary housings, with there being a discrete gap between each said rotor disc and each of said housings, with said discrete gap containing a working fluid of sufficient viscosity to provide fluid friction resistance roughly equivalent to said rotational power at a variety of wind resource intensities, said thermal generator further including frictional means at the surfaces of said at least one disc and said at least two stationary housings, said frictional means enhancing said fluid friction resistance, extended surface means at the exterior or said at least two housings to enhance heat transfer to said thud containing additional heat, and insulated housing means to direct the flow of said fluid containing additional heat and to prevent loss of said additional heat to ambient air.

6. The apparatus of claim 1, wherein said each of said blade struts are fitted with a blade section, each said blade section having a fixed end and a free end, with said fixed end being secured to least part of said exterior surface and said free end composed of a relatively flexible material capable of deflection normal to the direction of said major axis of said elliptical section, whereby; said blade section can be deflected by said wind energy resource to enhance capture of energy throughout a rotational cycle of said vertical axis wind turbine.

7. The apparatus of claim 1, wherein said apparatus has mast extension means for both lowering said turbine around said base for repair functions and for constructing said turbine around said base and thereafter raising said turbine using said mast to an operational position located above said base.

8. The apparatus of claim 1, wherein said plurality of struts are composed of a fiberglass reinforced thermoset plastic composite material.

9. The apparatus of claim 1, wherein said plurality of struts are composed of a carbon fiber reinforced composite material.

10. The apparatus of claim 1, wherein said plurality of struts are composed of a fiber reinforced thermoplastic material.

11. The apparatus of claim 1, wherein said plurality of struts are composed of an extruded metal material.

12. A wind electric system, wherein the apparatus of claim 1 is coupled to electrical generating means, and said electrical generating means is connected to an electrical load, whereby; said rotational power is converted to electrical power delivered to said electrical load.

13. The wind electric system of claim 12, wherein said electrical load comprises at least one electrolysis cell, said at least one electrolysis cell connected to an output stream of hydrogen gas and further connected to an input stream of water.

14. The wind electric system of claim 13, further including hydrogen handling equipment for compressing, storing and transferring said output stream of hydrogen gas.

15. An energy distribution system, wherein the wind electric system of claim 14 further includes connection means to an electric power plant
whereby; said output stream of hydrogen gas can be burned in combination with a fossil fuel to produce an output of electricity to a grid distribution network.

16. An energy distribution system, wherein the wind electric system of claim 14 further includes connection means to a chemical process facility.

17. The energy distribution system of claim 16, wherein said chemical process facility has a process unit for the conversion of coal into methane.

18. The energy distribution system of claim 16, wherein said chemical process facility has a process unit for the conversion of high molecular weight hydrocarbons into low molecular weight hydrocarbons.

19. The apparatus of claim 1, wherein said wind energy resource comprises a flow composed primarily of carbon dioxide,
whereby; said wind turbine might be utilized to provide power to equipment and/or personnel in the thin martian atmosphere.

20. The apparatus of claim 1, wherein said wind energy resource comprises a flow composed primarily of photons and/or energetic particles,
whereby; said wind turbine might be utilized to provide power to equipment and/or personnel in the vacuum of space, such as the environment encountered on the surface of the moon.

21. The apparatus of claim 1, wherein said base is composed of a panelized, segmented tower assembly.

22. The apparatus of claim 21, wherein said tower assembly contains a thermal storage medium and transfer means for moving heat to process equipment.

23. The apparatus of claim 1, further including an optional wind deflector mounted independently of said apparatus and positioned to deflect said wind energy resource upward,
whereby; said wind energy resource can be concentrated before reaching said turbine.

* * * * *